United States Patent

Langner et al.

[15] 3,699,691
[45] Oct. 24, 1972

[54] METHOD FOR CONNECTING FLOWLINES TO A PLATFORM

[72] Inventors: Carl G. Langner, Gainesville, Fla.; Robert C. Visser, Calgary, Alberta, Canada

[73] Assignee: Shell Oil Company, New York, N.Y.

[22] Filed: Feb. 8, 1971

[21] Appl. No.: 113,422

[52] U.S. Cl. ................................................61/72.3
[51] Int. Cl. ............................F16l 1/00, B02b 17/00
[58] Field of Search ......61/46.5, 72.1, 72.3; 166/0.5, 166/0.6

[56] References Cited

UNITED STATES PATENTS

| 3,640,080 | 2/1972 | Neal | 61/72.3 |
| 3,650,114 | 3/1972 | Neal | 61/72.3 |
| 3,466,882 | 9/1969 | Broussard et al. | 61/72.3 |
| 3,434,296 | 3/1969 | Otteman et al. | 61/72.3 |
| 3,517,518 | 6/1970 | Horton | 61/72.3 |
| 3,531,941 | 10/1970 | Vincent | 61/72.3 |

*Primary Examiner*—David J. Williamowsky
*Assistant Examiner*—David H. Corbin
*Attorney*—Theodore E. Bieber and Harold L. Denkler

[57] ABSTRACT

A method for connecting an underwater flowline having a substantial portion thereof lying along the floor of a body of water to an offshore platform structure positioned on the floor. One of the natural sag lines of the flowline is determined and a plurality of flowline clamps (with locks) are installed on the platform structure substantially conforming to the predetermined natural sag line in such a manner that a line drawn through the locks assumes a shape related to substantially the predetermined natural sag line. The flowline is pulled into engagement with the locks and secured thereto.

9 Claims, 4 Drawing Figures

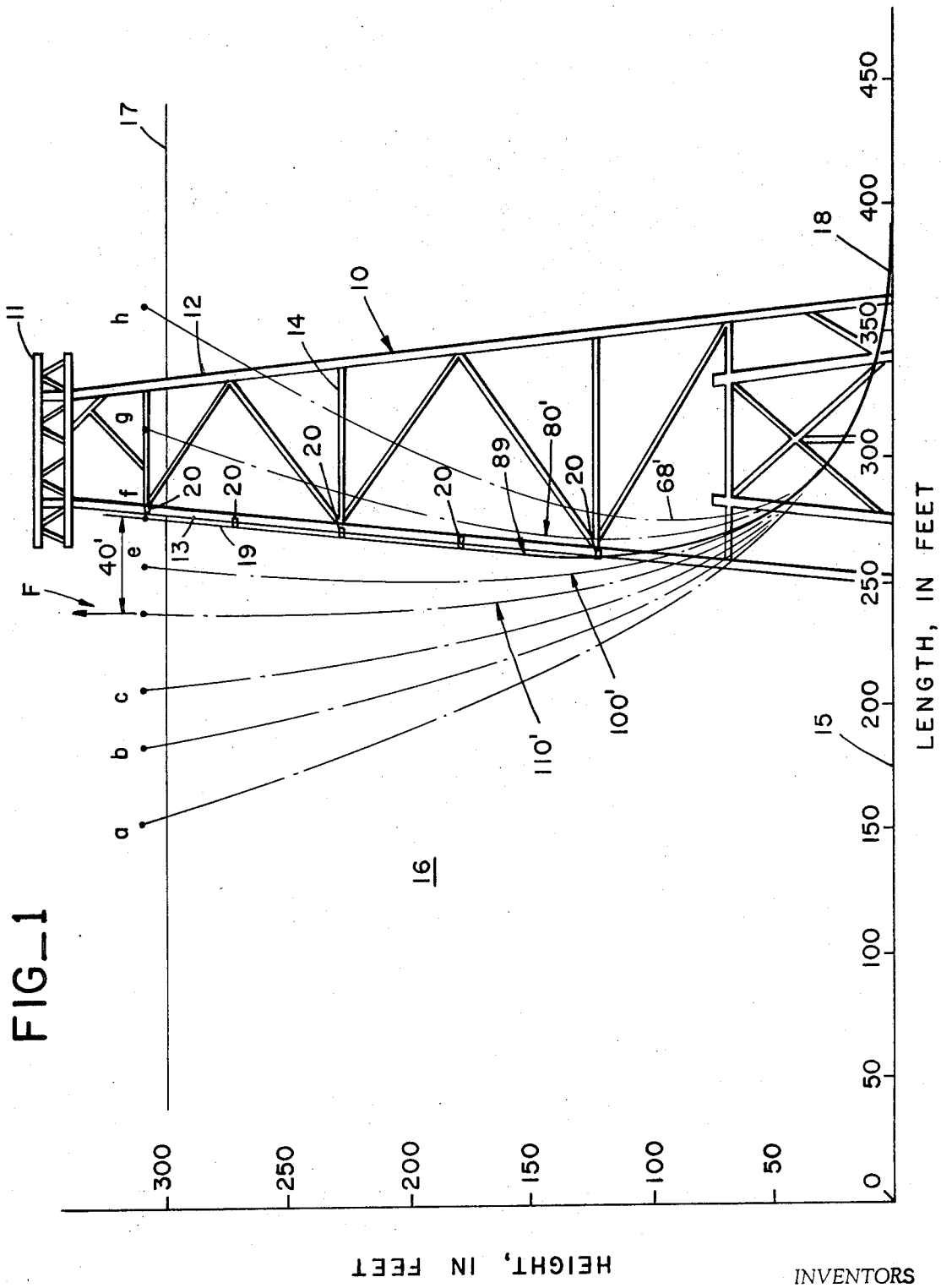

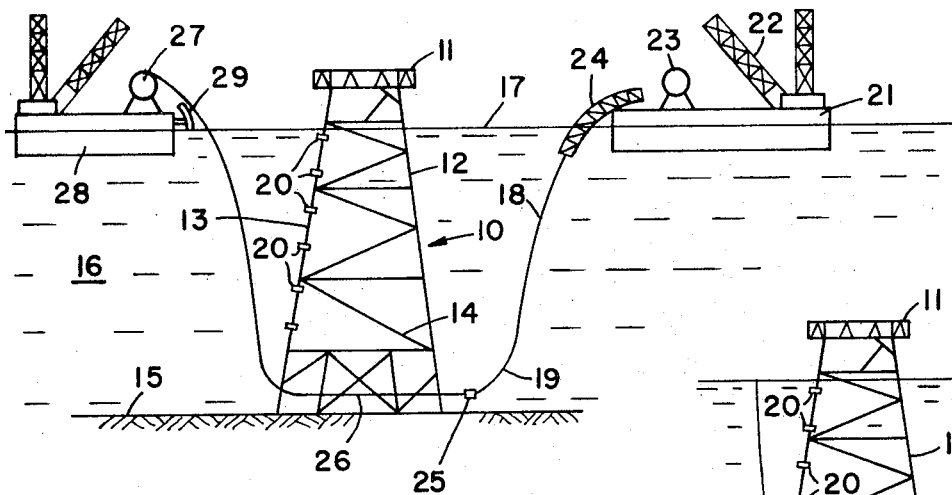
FIG_2
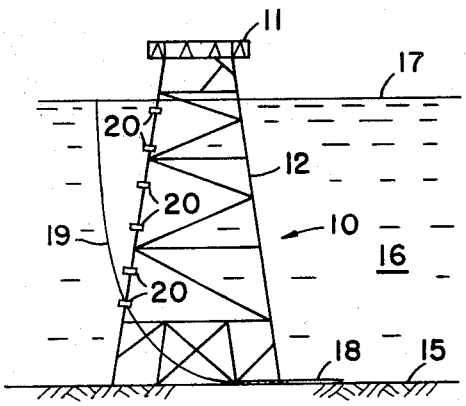
FIG_3
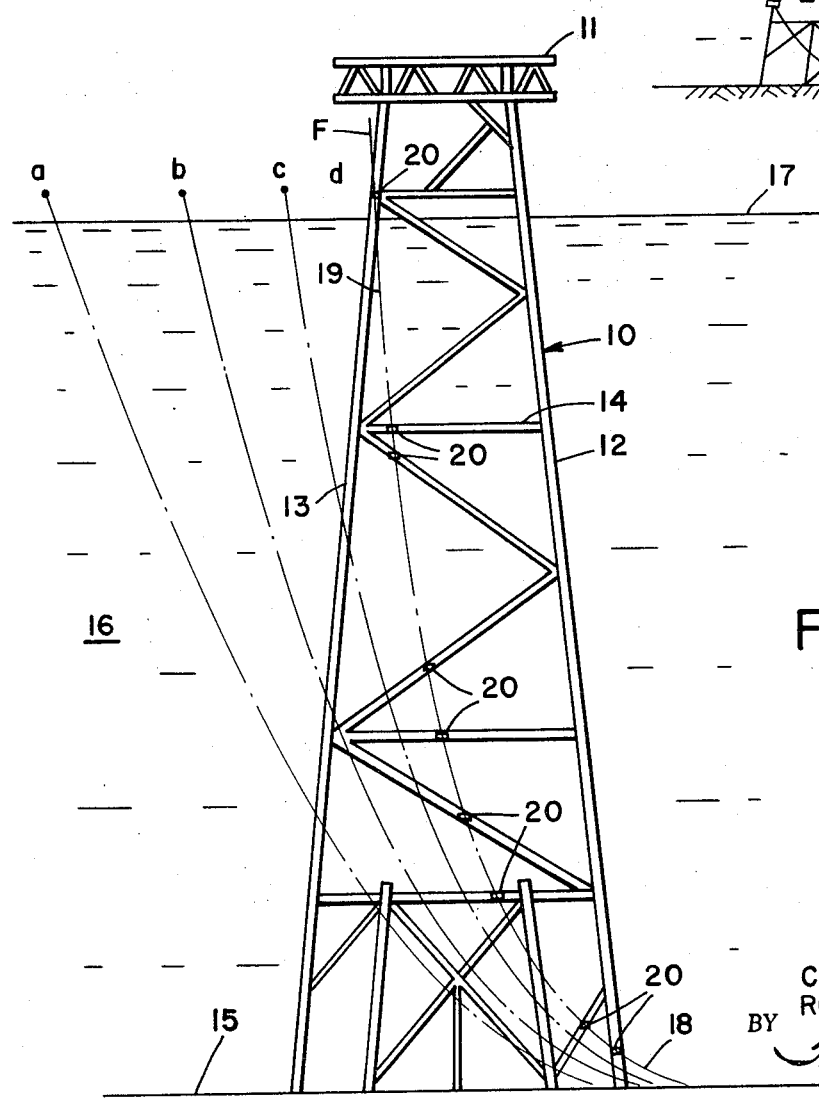
FIG_4
INVENTORS
CARL G. LANGNER
ROBERT C. VISSER
BY Theodore E. Bieber
ATTORNEY

METHOD FOR CONNECTING FLOWLINES TO A PLATFORM

BACKGROUND OF THE INVENTION

1. Field of the Invention

This invention relates to underwater flowlines, and more particularly to a method for connecting an underwater flowline to an offshore platform structure.

2. Description of the Prior Art

The development of offshore oil and gas wells frequently necessitates the use of offshore installations or so-called "platforms." These installations are used, for example, for drilling and subsequently for producing a well or wells. Accordingly, it is often desirable to provide one or more flowlines from a platform to a remote point, for example to shore or to another platform. The flowlines may serve many purposes, the most common being to carry off the output of oil or gas from a well. Since the flowline (also referred to herein as pipeline) lies in a substantially horizontal position along the floor of the body of water in which the platform is located, a problem arises in establishing fluid communication between the flowline and the surface of the platform which is above the surface of the body of water. It will be thus apparent that either the flowline must be bent from its horizontal position on the ocean floor to a vertical position extending to the upper surface of the platform or a separate vertical extension must be installed and connected through an angular or bent joint to the flowline on the ocean floor. The vertical portion is generally referred to as the flowline "riser."

The present practice for installing the "riser" is to provide a vertical flowline or pipeline segment along the side of the platform which extends to the floor of the body of water and is connected to the underwater flowline by divers. However, this is a generally cumbersome and expensive operation, particularly in relatively deep water where the divers' effectiveness is severely impaired.

Another method of connecting a flowline to a platform comprises first connecting the "riser" to the flowline and then lowering the assembly down a leg of the platform while simultaneously laying the flowline from a barge proceeding away from the platform. However, this procedure also has drawbacks in that the lowering and laying operation must be carefully programmed to prevent damage to the pipeline and/or riser. In addition, the method is only applicable where a pipeline is laid away from a platform and cannot be readily and easily employed where a pipeline approaches a platform.

SUMMARY OF THE INVENTION

It is an object of this invention to provide a method for installing a flowline riser to an offshore platform which eliminates the need for making an underwater connection.

It is a further object of this invention to provide a method of installing risers in which the underwater flowline and the riser may be formed of one continuous pipeline.

It is a still further object of this invention to provide a method for bending the underwater flowline to provide an upstanding portion which serves as a riser.

It is another object of this invention to provide a method for bending the flowline to form a riser while maintaining the radius of curvature above a predetermined minimum so as to prevent buckling of the flowline.

These and other objects are preferably accomplished by determining one of the natural sag lines of the flowline to be connected to the platform structure and installing a plurality of flowline locks on the platform structure substantially conforming to the predetermined natural sag line in such a manner that a line drawn through the locks assumes a shape related to substantially the predetermined natural sag line. The flowline is then pulled into engagement with the locks and secured thereto.

BRIEF DESCRIPTION OF THE DRAWINGS

FIG. 1 is a vertical sectional view, partly graphical, of a preferred method for carrying out my invention;

FIG. 2 is a vertical sectional view of a further step in carrying out my invention;

FIG. 3 is a vertical sectional view of a portion of the arrangement of FIG. 2 showing a further step in carrying out my invention; and FIG. 4 is a vertical sectional, partly schematic, view of a further embodiment of my invention.

DESCRIPTION OF THE PREFERRED EMBODIMENT

In U.S. Pat. No. 3,466,882, a method is described for determining the minimum bend radius of a pipe. The minimum bend radius is defined as the minimum radius of curvature through which the pipe may be bent without buckling the pipe. The minimum bend radius can be determined from the formula:

$$\text{MINIMUM RADIUS} = 2(r_o^2/T)$$

where $r_o$ is the initial radius of the pipe and $t$ is the wall thickness.

The "natural sag line" is defined as the curve assumed by a pipe supported only at one end by a lifting or supporting force F. Although only one "natural sag line" is discussed in actuality, a pipe has a plurality of natural sag lines. There is one natural sag line for a pipe for each vertical height and each force F. In the case of a horizontal flowline having one end bent up to a vertical position, the curvature of the natural sag line will depend upon the force F and the vertical distance between the end of the pipe and the horizontal flowline.

Referring now to FIG. 1 of the drawing, a platform structure 10 is shown having a work platform 11 and a plurality of legs (only legs 12 and 13 being shown in FIG. 1) with suitable bracing 14 extending therebetween for supporting the structure 10 on the floor 15 of a body of water 16. Work platform 11 is disposed above the surface or water line 17 of the body of water 16. Assuming for the sake of illustration that the height of platform structure 10 conforms to the Y-axis and the floor 15 of the body of water 16 conforms to the X-axis, graphical data may be presented for installing a flowline riser in accordance with my invention. A flowline 18 is shown having a substantial portion thereof disposed along the floor 15. Flowline 18 extends from a remote location, such as an offshore gathering station, a pipe laying barge, etc.

The minimum radius of the flowline can be determined using the method disclosed in the aforementioned patent to Broussard et al. For example, assuming a water depth of 300 feet as in FIG. 1, a coated flowline having an 8 inch diameter and 7/16 inch wall thickness, supported at its top by a lifting or supporting force F, would have a plurality of natural sag lines a through h as shown in dotted lines. The lifting force F required for each of the natural sag lines shown can be calculated from known laws of mechanics. The curvature of the pipe is dependent on its submerged weight $w$ and the flexural rigidity, $EI$, where $E$ is the modulus of elasticity and $I$ is the moment of inertia. When the pipe is first lifted from the bottom, its bend can be determined by ordinary beam theory. As the pipe is lifted further from the bottom, the bending will approach a limiting value when the height of the pipe is a distance off the bottom approximately equal to $C$ the characteristic length of the pipe, where $C=(EI/W)$ 1/3. The axial force on the pipe must be sufficient to maintain the bend radius larger than the minimum bend radius of the pipe. A complete description of various methods for determining sag lines of pipe is given by D. A. Dixon and D. R. Rutledge, Trans ASME, 1967, Paper 67–Pet.–6. and papers OTC 1071 and 1072, Offshore Tech. Conf., 1969, Houston, Tex. Also see U.S. Pat. No. 3,331,212. One of these sag lines, for example, sag line $f$, extends substantially along the leg 13 of platform structure 10. The minimum radius of this sag line, using for example the 8 inch diameter flowline as discussed hereinabove, is approximately 89 feet. As can be seen in FIG. 1, the riser portion 19 of flowline 18 is connected to the platform structure 10 by means of a plurality of clamps 20 extending along the leg 13 of platform structure 10, the procedure for accomplishing this to be discussed further hereinbelow.

Referring now to FIG. 2, wherein like numerals refer to like parts of FIG. 1, a pipe lay barge 21 is shown disposed a short distance from platform structure 10 on water surface 17. Barge 21 includes suitable equipment thereon, such as a crane 22, a winch 23, a stinger 24, and the like, for laying flowline 18 along the floor 15 of the body of water 16. As shown in FIG. 2, a suitable length of flowline 18 has been laid from barge 21 and the riser portion 19, generally equal in length to the height of platform structure 10, has been welded or otherwise secured to flowline 18. A conventional pulling head 25 is secured to the tip of riser portion 19. Thus, the length of riser portion 19 is correlated with the predetermined data of FIG. 1 to insure that its length is adequate.

Any suitable equipment may be used to bring flowline 18 into engagement with the leg 13 of platform structure 10. For example, a wireline 26 is attached to pulling head 25 with wireline 26 leading to a winch 27 or the like on a second work barge 28 disposed a short distance from platform structure 10. The clamps 20 are secured in place along leg 13. The riser clamps 20 preferably have spring-loaded front jaws which, once caught, prevent the riser portion 19 of flowline 18 from escaping.

In operation, the wireline 26 is pulled by means of winch 27 and barge 28 and flowline 18 is maneuvered to a position which the graph of FIG. 1 predicts will cause the flowline 18 to pass adjacent one of the clamps 20 (for example, the lowermost clamp on leg 13 in FIG. 2). At this point, a diver may be sent down into the body of water 16 to determine the exact location of the flowline 18 with respect to the lowermost clamp. By paying out from winch 23 on barge 21 (or from crane 22 on barge 21 by transferring the flowline 18 thereto) and taking up on winch 27, the flowline 18 may be gradually guided into locking engagement with the lowermost clamp 20. The flowline 18 may then be guided into locking engagement with the remaining clamps 20 using both the aforementioned paying out and taking in on winches 23 and 27 and a conventional bending shoe 29 on barge 29 as is well known in the pipe laying art. The final position of riser portion 19 is shown in FIG. 1 where the pulling head 25 has been removed and the free end thereof may be coupled to suitable equipment on platform structure 10 (not shown).

The underwater diver may be used to communicate between the point of engagement of flowline 18 with each clamp 20 so as to expedite the engagement thereof. The clamps 20 are preferably designed to clamp down and tighten on the particular diameter of flowline 18 adjacent thereto, thereby securing the vertical portion of the flowline to the platform. This may be done by divers manually turning a drive screw on each clamp or remotely by personnel on the platform using hydraulic devices.

Thus, as shown by the solid line extending through all the clamps 20 in FIG. 1, the riser portion 19 is connected to all the clamps 20 along leg 13. Additionally, if desired, clamps 20 may be disposed on other parts along line $f$ of the frame work supporting platform structure 10 on the floor 15 of the body of water 16 (not shown).

Referring now to FIG. 4 wherein like numerals refer to like parts of FIG. 1, the predetermined natural sag lines a through $d$ of flowline 18, supported by force F at the top thereof, may conform to a line passing substantially through the framework of platform structure 10 (as shown in FIG. 4 wherein sag line $d$ passes substantially through the framework of structure 10). A plurality of the clamps 20 are secured to the legs 12 and 13 and bracing 14 of structure 10 as indicated. The flowline 18 is then pulled into selective engagement with each clamp 20 as discussed hereinabove with respect to the flowline of FIGS. 1 through 3. The preferable order of engagement is the lowermost clamp to be engaged first, the uppermost clamp to be engaged last.

Although a preferred method for pulling a flowline into engagement with a platform structure has been disclosed hereinabove, obviously other methods may be used. For example, instead of work barge 28, suitable equipment for pulling the flowline may be provided on the work platform 11 of platform structure 10.

I claim as my invention:

1. A method for connecting an underwater flowline having a substantial portion thereof adapted to lie along the floor of a body of water to an offshore platform structure positioned on said floor, said platform having supporting framework thereon including a plurality of substantially vertical legs supporting said structure on the floor of said body of water, said method comprising the steps of:

positioning said flowline along the floor of said body of water such that an end of said flowline is adjacent said platform structure;

determining at least one natural sag line of said flowline which extends substantially along the framework of said platform structure, said natural sag line being the curve assumed by said flowline when supported only at said end by a given lifting force;

installing a plurality of flowline connecting means in a substantially vertical plane on said platform structure substantially conforming to said predetermined natural sag line in such a manner that a line drawn through said plurality of connecting means assumes a shape substantially conforming to said predetermined natural sag line;

pulling said flowline into engagement with at least some of said flowline connecting means by applying said lifting force to said end of said flowline; and securing said flowline to said flowline connecting means.

2. The method of claim 1 including the step of joining the upper end of said flowline to said platform structure.

3. The method of claim 1 wherein the step of determining at least one natural sag line of said flowline includes the step of first determining the minimum radius of said flowline and then determining said natural sag line using the predetermined minimum radius.

4. The method of claim 1 wherein the step of installing a plurality of flowline connecting means on said platform structure includes the step of installing a plurality of flowline locking clamps at spaced, vertical locations along the framework of said platform structure.

5. The method of claim 1 wherein the step of determining at least one natural sag line includes the step of determining the natural sag line of said flowline which conforms substantially to a line extending along one of the legs of said platform structure.

6. The method of claim 1 wherein the step of pulling said flowline into engagement with said flowline connecting means includes the step of laying said flowline from a flowline lay barge disposed on said water surface a short distance from said platform structure.

7. The method of claim 6 wherein the step of pulling said flowline includes the steps of:

attaching a pulling head to the free end of said flowline;

attaching a wireline to said pulling head; and attaching the free end of said wireline to a work barge disposed on said water surface a short distance from said platform structure opposite the side of said structure adjacent said flowline lay barge.

8. The method of claim 7 wherein the step of pulling said flowline includes the step of paying out said flowline from said flowline lay barge while pulling in on said wireline from said work barge.

9. The method of claim 8 including the step of attaching a riser portion to the free end of said flowline prior to attaching said pulling head thereto, said riser portion conforming in length substantially to the distance of said body of water from the floor to the water surface thereof; and subsequently attaching said pulling head to the free end of said riser portion.

* * * * *